United States Patent
Leijon et al.

(10) Patent No.: US 6,417,456 B1
(45) Date of Patent: Jul. 9, 2002

(54) INSULATED CONDUCTOR FOR HIGH-VOLTAGE WINDINGS AND A METHOD OF MANUFACTURING THE SAME

(75) Inventors: Mats Leijon, Västerås; Peter Carstensen, Huddinge, both of (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/194,577

(22) PCT Filed: May 27, 1997

(86) PCT No.: PCT/SE97/00901

§ 371 (c)(1),
(2), (4) Date: Nov. 27, 1998

(87) PCT Pub. No.: WO97/45918

PCT Pub. Date: Dec. 4, 1997

(30) Foreign Application Priority Data

May 29, 1996 (SE) ............................................... 9602079
May 29, 1996 (SE) ............................................... 9602090

(51) Int. Cl.⁷ ................................................. H01B 9/00
(52) U.S. Cl. ................................................. 174/120 SC
(58) Field of Search ........................ 174/105 R, 106 R, 174/102 SC, 105 SC, 106 SC, 120 SC, 102 SP, DIG. 14–DIG. 33, 73.1; 310/254, 45

(56) References Cited

U.S. PATENT DOCUMENTS

| | | |
|---|---|---|
| 681,800 A | 9/1901 | Lasche |
| 847,008 A | 3/1907 | Kitsee |
| 1,304,451 A | 5/1919 | Burnham |
| 1,418,856 A | 6/1922 | Williamson |
| 1,481,585 A | 1/1924 | Beard |

(List continued on next page.)

FOREIGN PATENT DOCUMENTS

| | | |
|---|---|---|
| AT | 399790 | 7/1995 |
| BE | 565063 | 2/1957 |
| CH | 391071 | 4/1965 |
| CH | 534448 | 2/1973 |
| CH | 539328 | 7/1973 |

(List continued on next page.)

OTHER PUBLICATIONS

A test installation of a self–tuned ac filter in the Konti–Skan 2 HVDC link; T. Holmgren, G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp 64–70.

Analysis of faulted Power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 300 MW turbine generator;L.P. Gnedin et al;*Elektrotechnika*, 1970, pp 6–8.

(List continued on next page.)

*Primary Examiner*—Chau N. Nguyen
(74) *Attorney, Agent, or Firm*—Dykema Gossett PLLC

(57) ABSTRACT

An insulated conductor for high-voltage windings in electric machines employs conductor formed of one or more strands, an inner, first semi-conductive layer surrounding the strands, a first insulating layer surrounding the inner, first semi-conductive layer and an outer, second semi-conductive layer surrounding the first insulating layer. The second semi-conductive layer has at least two different earth points along the insulated conductor, the second semi-conductive layer has breaks located between consecutive earth points. A shielding device is located in each of said breaks for reducing amplification of the electric field strength produced at the breaks.

14 Claims, 5 Drawing Sheets

U.S. PATENT DOCUMENTS

| | | |
|---|---|---|
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahahourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A * | 8/1974 | Hvizd, Jr. ......... 174/102 SC X |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |

| | | | | | |
|---|---|---|---|---|---|
| 4,245,182 A | 1/1981 | Aotsu et al. | 4,615,109 A | 10/1986 | Wcislo et al. |
| 4,246,694 A | 1/1981 | Raschbichler et al. | 4,615,778 A | 10/1986 | Elton |
| 4,255,684 A | 3/1981 | Mischler et al. | 4,618,795 A | 10/1986 | Cooper et al. |
| 4,258,280 A | 3/1981 | Starcevic | 4,619,040 A | 10/1986 | Wang et al. |
| 4,262,209 A | 4/1981 | Berner | 4,622,116 A | 11/1986 | Elton et al. |
| 4,274,027 A | 6/1981 | Higuchi et al. | 4,633,109 A | 12/1986 | Feigel |
| 4,281,264 A | 7/1981 | Keim et al. | 4,650,924 A | 3/1987 | Kauffman et al. |
| 4,292,558 A | 9/1981 | Flick et al. | 4,652,963 A | 3/1987 | Fahlen |
| 4,307,311 A | 12/1981 | Grozinger | 4,656,316 A | 4/1987 | Meltsch |
| 4,308,476 A | 12/1981 | Schuler | 4,656,379 A | 4/1987 | McCarty |
| 4,308,575 A | 12/1981 | Mase | 4,677,328 A | 6/1987 | Kumakura |
| 4,310,966 A | 1/1982 | Brietenbach | 4,687,882 A | 8/1987 | Stone et al. |
| 4,314,168 A | 2/1982 | Breitenbach | 4,692,731 A | 9/1987 | Osinga |
| 4,317,001 A | 2/1982 | Silver et al. | 4,723,083 A | 2/1988 | Elton |
| 4,320,645 A | 3/1982 | Stanley | 4,723,104 A | 2/1988 | Rohatyn |
| 4,321,426 A | 3/1982 | Schaeffer | 4,724,345 A | 2/1988 | Elton et al. |
| 4,321,518 A | 3/1982 | Akamatsu | 4,732,412 A * | 3/1988 | Van Der Linden et al. ... 285/47 |
| 4,330,726 A | 5/1982 | Albright et al. | 4,737,704 A | 4/1988 | Kalinnikov et al. |
| 4,337,922 A | 7/1982 | Streiff et al. | 4,745,314 A | 5/1988 | Nakano |
| 4,341,989 A | 7/1982 | Sandberg et al. | 4,761,602 A | 8/1988 | Leibovich |
| 4,347,449 A | 8/1982 | Beau | 4,766,365 A | 8/1988 | Bolduc et al. |
| 4,347,454 A | 8/1982 | Gellert et al. | 4,771,168 A | 9/1988 | Gundersen et al. |
| 4,357,542 A | 11/1982 | Kirschbaum | 4,785,138 A | 11/1988 | Brietenbach et al. |
| 4,360,748 A | 11/1982 | Raschbichler et al. | 4,795,933 A | 1/1989 | Sakai |
| 4,361,723 A | 11/1982 | Hvizd, Jr. et al. | 4,827,172 A | 5/1989 | Kobayashi |
| 4,363,612 A | 12/1982 | Meyers | 4,845,308 A | 7/1989 | Womack, Jr. et al. |
| 4,365,178 A | 12/1982 | Lexz | 4,847,747 A | 7/1989 | Abbondanti |
| 4,367,425 A | 1/1983 | Mendelsohn et al. | 4,853,565 A | 8/1989 | Elton et al. |
| 4,367,890 A | 1/1983 | Spirk | 4,855,536 A * | 8/1989 | Varreng ..................... 174/73.1 |
| 4,368,418 A | 1/1983 | Demello et al. | 4,859,810 A | 8/1989 | Cloetens et al. |
| 4,369,389 A | 1/1983 | Lambrecht | 4,859,989 A * | 8/1989 | McPherson ....... 174/120 SC X |
| 4,371,745 A | 2/1983 | Sakashita | 4,860,430 A | 8/1989 | Raschbichler et al. |
| 4,384,944 A | 5/1983 | Silver et al. | 4,864,266 A | 9/1989 | Feather et al. |
| 4,387,316 A | 6/1983 | Katsekas | 4,883,230 A | 11/1989 | Lindstrom |
| 4,401,920 A | 8/1983 | Taylor et al. | 4,890,040 A | 12/1989 | Gundersen |
| 4,403,163 A | 9/1983 | Rarmerding et al. | 4,894,284 A | 1/1990 | Yamanouchi et al. |
| 4,404,486 A | 9/1983 | Keim et al. | 4,914,386 A | 4/1990 | Zocholl |
| 4,411,710 A | 10/1983 | Mochizuki et al. | 4,918,347 A | 4/1990 | Takaba |
| 4,421,284 A | 12/1983 | Pan | 4,918,835 A | 4/1990 | Wcislo et al. |
| 4,425,521 A | 1/1984 | Rosenberry, Jr. et al. | 4,924,342 A | 5/1990 | Lee |
| 4,426,771 A | 1/1984 | Wang et al. | 4,926,079 A | 5/1990 | Niemela et al. |
| 4,429,244 A * | 1/1984 | Nikitin et al. .............. 310/254 | 4,942,326 A | 7/1990 | Butler, III et al. |
| 4,431,960 A | 2/1984 | Zucker | 4,949,001 A | 8/1990 | Campbell |
| 4,432,029 A | 2/1984 | Lundqvist | 4,982,147 A | 1/1991 | Lauw |
| 4,437,464 A | 3/1984 | Crow | 4,994,952 A | 2/1991 | Silva et al. |
| 4,443,725 A | 4/1984 | Derderian et al. | 4,997,995 A | 3/1991 | Simmons et al. |
| 4,470,884 A | 9/1984 | Carr | 5,012,125 A | 4/1991 | Conway |
| 4,473,765 A | 9/1984 | Butman, Jr. et al. | 5,030,813 A | 7/1991 | Stanisz |
| 4,475,075 A | 10/1984 | Munn | 5,035,238 A | 7/1991 | Tajima |
| 4,477,690 A | 10/1984 | Nikitin et al. | 5,036,165 A * | 7/1991 | Elton et al. ........... 174/102 SC |
| 4,481,438 A | 11/1984 | Keim | 5,066,881 A | 11/1991 | Elton et al. |
| 4,484,106 A | 11/1984 | Taylor et al. | 5,067,046 A | 11/1991 | Elton et al. |
| 4,488,079 A | 12/1984 | Dailey et al. | 5,083,360 A | 1/1992 | Valencic et al. |
| 4,490,651 A | 12/1984 | Taylor et al. | 5,086,246 A | 2/1992 | Dymond et al. |
| 4,503,284 A | 3/1985 | Minnick et al. | 5,091,609 A | 2/1992 | Swada et al. |
| 4,508,251 A | 4/1985 | Harada et al. | 5,094,703 A | 3/1992 | Takaoka et al. |
| 4,510,077 A | 4/1985 | Elton | 5,095,175 A | 3/1992 | Yoshida et al. |
| 4,517,471 A | 5/1985 | Sachs | 5,097,241 A | 3/1992 | Smith et al. |
| 4,520,287 A | 5/1985 | Wang et al. | 5,097,591 A | 3/1992 | Wcislo et al. |
| 4,523,249 A | 6/1985 | Arimoto | 5,111,095 A | 5/1992 | Hendershot |
| 4,538,131 A | 8/1985 | Baier et al. | 5,124,607 A | 6/1992 | Rieber et al. |
| 4,546,210 A | 10/1985 | Akiba et al. | 5,136,459 A | 8/1992 | Fararooy |
| 4,551,780 A | 11/1985 | Canay | 5,140,290 A | 8/1992 | Dersch |
| 4,557,038 A | 12/1985 | Wcislo et al. | 5,153,460 A | 10/1992 | Bovino et al. |
| 4,560,896 A | 12/1985 | Vogt et al. | 5,168,662 A | 12/1992 | Nakamura et al. |
| 4,565,929 A | 1/1986 | Baskin et al. | 5,171,941 A | 12/1992 | Shimizu et al. |
| 4,571,453 A | 2/1986 | Takaoka et al. | 5,182,537 A | 1/1993 | Thuis |
| 4,588,916 A | 5/1986 | Lis | 5,187,428 A | 2/1993 | Hutchison et al. |
| 4,590,416 A | 5/1986 | Porche et al. | 5,231,249 A * | 7/1993 | Kimura et al. ........ 174/105 SC |
| 4,594,630 A | 6/1986 | Rabinowitz et al. | 5,235,488 A | 8/1993 | Koch |
| 4,607,183 A | 8/1986 | Rieber et al. | 5,246,783 A | 9/1993 | Spenadel et al. |

| | | | | | | |
|---|---|---|---|---|---|---|
| 5,264,778 A | 11/1993 | Kimmel et al. | | DE | 846583 | 8/1952 |
| 5,287,262 A | 2/1994 | Klein | | DE | 875227 | 4/1953 |
| 5,304,883 A | 4/1994 | Denk | | DE | 975999 | 1/1963 |
| 5,305,961 A | 4/1994 | Errard et al. | | DE | 1465719 | 5/1969 |
| 5,321,308 A | 6/1994 | Johncock | | DE | 1807391 | 5/1970 |
| 5,323,330 A | 6/1994 | Asplund et al. | | DE | 2050674 | 5/1971 |
| 5,325,008 A | 6/1994 | Grant | | DE | 1638176 | 6/1971 |
| 5,325,259 A | 6/1994 | Paulsson | | DE | 2155371 | 5/1973 |
| 5,327,637 A | 7/1994 | Britenbach et al. | | DE | 2400698 | 7/1975 |
| 5,341,281 A | 8/1994 | Skibinski | | DE | 2520511 | 11/1976 |
| 5,343,139 A | 8/1994 | Gyugyi et al. | | DE | 2656389 | 6/1978 |
| 5,355,046 A | 10/1994 | Weigelt | | DE | 2721905 | 11/1978 |
| 5,365,132 A | 11/1994 | Hann et al. | | DE | 2824951 | 12/1979 |
| 5,387,890 A | 2/1995 | Estop et al. | | DE | 2835386 | 2/1980 |
| 5,397,513 A | 3/1995 | Steketee, Jr. | | DE | 2839517 | 3/1980 |
| 5,399,941 A | 3/1995 | Grothaus et al. | | DE | 2854520 | 6/1980 |
| 5,400,005 A | 3/1995 | Bobry | | DE | 3009102 | 9/1980 |
| 5,408,169 A | 4/1995 | Jeanneret | | DE | 2913697 | 10/1980 |
| 5,449,861 A | 9/1995 | Fujino et al. | | DE | 2920478 | 12/1980 |
| 5,452,170 A | 9/1995 | Ohde et al. | | DE | 3028777 | 3/1981 |
| 5,468,916 A | 11/1995 | Litenas et al. | | DE | 2939004 | 4/1981 |
| 5,499,178 A | 3/1996 | Mohan | | DE | 3006382 | 8/1981 |
| 5,500,632 A | 3/1996 | Halser, III | | DE | 3008818 | 9/1981 |
| 5,510,942 A | 4/1996 | Bock et al. | | DE | 209313 | 4/1984 |
| 5,530,307 A | 6/1996 | Horst | | DE | 3305225 | 8/1984 |
| 5,533,658 A | 7/1996 | Benedict et al. | | DE | 3309051 | 9/1984 |
| 5,534,754 A | 7/1996 | Poumey | | DE | 3441311 | 5/1986 |
| 5,545,853 A | 8/1996 | Hildreth | | DE | 3543106 | 6/1987 |
| 5,550,410 A | 8/1996 | Titus | | DE | 2917717 | 8/1987 |
| 5,583,387 A | 12/1996 | Takeuchi et al. | | DE | 3612112 | 10/1987 |
| 5,587,126 A | 12/1996 | Steketee, Jr. | | DE | 3726346 | 2/1989 |
| 5,598,137 A | 1/1997 | Alber et al. | | DE | 3925337 | 2/1991 |
| 5,607,320 A | 3/1997 | Wright | | DE | 4023903 | 11/1991 |
| 5,612,510 A | 3/1997 | Hildreth | | DE | 4022476 | 1/1992 |
| 5,663,605 A | 9/1997 | Evans et al. | | DE | 4233558 | 3/1994 |
| 5,672,926 A | 9/1997 | Brandes et al. | | DE | 4402184 | 8/1995 |
| 5,689,223 A | 11/1997 | Demarmels et al. | | DE | 4409794 | 8/1995 |
| 5,807,447 A * | 9/1998 | Forrest ............... 174/105 R X | | DE | 4412761 | 10/1995 |
| 5,834,699 A | 11/1998 | Buck et al. | | DE | 4420322 | 12/1995 |
| | | | | DE | 19620906 | 1/1996 |
| | FOREIGN PATENT DOCUMENTS | | | DE | 4438186 | 5/1996 |
| | | | | DE | 19020222 | 3/1997 |
| CH | 657482 | 8/1986 | | DE | 19547229 | 6/1997 |
| DD | 137164 | 8/1979 | | DE | 468827 | 7/1997 |
| DD | 138840 | 11/1979 | | DE | 134022 | 12/2001 |
| DE | 40414 | 8/1887 | | EP | 049104 | 4/1982 |
| DE | 277012 | 7/1914 | | EP | 0493704 | 4/1982 |
| DE | 336418 | 6/1920 | | EP | 0056580 A1 | 7/1982 |
| DE | 372390 | 3/1923 | | EP | 078908 | 5/1983 |
| DE | 386561 | 12/1923 | | EP | 0120154 | 10/1984 |
| DE | 387973 | 1/1924 | | EP | 0130124 | 1/1985 |
| DE | 406371 | 11/1924 | | EP | 0142813 | 5/1985 |
| DE | 425551 | 2/1926 | | EP | 0155405 | 9/1985 |
| DE | 426793 | 3/1926 | | EP | 0102513 | 1/1986 |
| DE | 432169 | 7/1926 | | EP | 0174783 | 3/1986 |
| DE | 433749 | 9/1926 | | EP | 0185788 | 7/1986 |
| DE | 435608 | 10/1926 | | EP | 0277358 | 8/1986 |
| DE | 435609 | 10/1926 | | EP | 0234521 | 9/1987 |
| DE | 441717 | 3/1927 | | EP | 0244069 | 11/1987 |
| DE | 443011 | 4/1927 | | EP | 0246377 | 11/1987 |
| DE | 460124 | 5/1928 | | EP | 0265868 | 5/1988 |
| DE | 482506 | 9/1929 | | EP | 0274691 | 7/1988 |
| DE | 501181 | 7/1930 | | EP | 0280759 | 9/1988 |
| DE | 523047 | 4/1931 | | EP | 0282876 | 9/1988 |
| DE | 568508 | 1/1933 | | EP | 0309096 | 3/1989 |
| DE | 572030 | 3/1933 | | EP | 0314860 | 5/1989 |
| DE | 584639 | 9/1933 | | EP | 0316911 | 5/1989 |
| DE | 586121 | 10/1933 | | EP | 0317248 | 5/1989 |
| DE | 604972 | 11/1934 | | EP | 0335430 | 10/1989 |
| DE | 629301 | 4/1936 | | EP | 0342554 | 11/1989 |
| DE | 673545 | 3/1939 | | EP | 0221404 | 5/1990 |
| DE | 719009 | 3/1942 | | | | |

| | | | | | |
|---|---|---|---|---|---|
| EP | 0375101 | 6/1990 | GB | 1130398 | 2/1968 |
| EP | 0406437 | 1/1991 | GB | 1117401 | 6/1968 |
| EP | 0439410 | 7/1991 | GB | 1135242 | 12/1968 |
| EP | 0440865 | 8/1991 | GB | 1147049 | 4/1969 |
| EP | 0469155 A1 | 2/1992 | GB | 1157885 | 7/1969 |
| EP | 0490705 | 6/1992 | GB | 1174659 | 12/1969 |
| EP | 0503817 | 9/1992 | GB | 1236082 | 6/1971 |
| EP | 0571155 | 11/1993 | GB | 1268770 | 3/1972 |
| EP | 0620570 | 10/1994 | GB | 1319257 | 6/1973 |
| EP | 0620630 | 10/1994 | GB | 1322433 | 7/1973 |
| EP | 0642027 | 3/1995 | GB | 1340983 | 12/1973 |
| EP | 0671632 | 9/1995 | GB | 1341050 | 12/1973 |
| EP | 0676777 | 10/1995 | GB | 1365191 | 8/1974 |
| EP | 0677915 | 10/1995 | GB | 1395152 | 5/1975 |
| EP | 0684679 | 11/1995 | GB | 1424982 | 2/1976 |
| EP | 0684682 | 11/1995 | GB | 1426594 | 3/1976 |
| EP | 0686019 | 1/1996 | GB | 1438610 | 6/1976 |
| EP | 0732787 | 9/1996 | GB | 1445284 | 8/1976 |
| EP | 0738034 | 10/1996 | GB | 1479904 | 7/1977 |
| EP | 0739087 A2 | 10/1996 | GB | 1493163 | 11/1977 |
| EP | 0740315 | 10/1996 | GB | 1502938 | 3/1978 |
| EP | 0749190 A2 | 12/1996 | GB | 1525745 | 9/1978 |
| EP | 0751605 | 1/1997 | GB | 2000625 | 1/1979 |
| EP | 0739087 A3 | 3/1997 | GB | 1548633 | 7/1979 |
| EP | 0749193 A3 | 3/1997 | GB | 2046142 | 11/1979 |
| EP | 0780926 | 6/1997 | GB | 2022327 | 12/1979 |
| EP | 0802542 | 10/1997 | GB | 2025150 | 1/1980 |
| EP | 0913912 A1 | 5/1999 | GB | 2034101 | 5/1980 |
| FR | 805544 | 4/1936 | GB | 1574796 | 9/1980 |
| FR | 841351 | 1/1938 | GB | 2070341 | 9/1981 |
| FR | 847899 | 12/1938 | GB | 2070470 | 9/1981 |
| FR | 916959 | 12/1946 | GB | 2071433 | 9/1981 |
| FR | 1011924 | 4/1949 | GB | 2081523 | 2/1982 |
| FR | 1126975 | 3/1955 | GB | 2099635 | 12/1982 |
| FR | 1238795 | 7/1959 | GB | 2105925 | 3/1983 |
| FR | 2108171 | 5/1972 | GB | 2106306 | 4/1983 |
| FR | 2251938 | 6/1975 | GB | 2106721 | 4/1983 |
| FR | 2305879 | 10/1976 | GB | 2136214 | 9/1984 |
| FR | 2376542 | 7/1978 | GB | 2140195 | 11/1984 |
| FR | 2467502 | 4/1981 | GB | 2150153 | 6/1985 |
| FR | 2481531 | 10/1981 | GB | 2268337 | 1/1994 |
| FR | 2556146 | 6/1985 | GB | 2273819 | 6/1994 |
| FR | 2594271 | 8/1987 | GB | 2283133 | 4/1995 |
| FR | 2708157 | 1/1995 | GB | 2289992 | 12/1995 |
| GB | 123906 | 6/1919 | GB | 2308490 | 6/1997 |
| GB | 268271 | 3/1927 | GB | 2332557 | 6/1999 |
| GB | 293861 | 11/1928 | HU | 175494 | 11/1981 |
| GB | 292999 | 4/1929 | JP | 60206121 | 3/1959 |
| GB | 319313 | 7/1929 | JP | 57043529 | 8/1980 |
| GB | 518993 | 3/1940 | JP | 57126117 | 5/1982 |
| GB | 537609 | 6/1941 | JP | 59076156 | 10/1982 |
| GB | 540456 | 10/1941 | JP | 59159642 | 2/1983 |
| GB | 589071 | 6/1947 | JP | 6264964 | 9/1985 |
| GB | 666883 | 2/1952 | JP | 1129737 | 5/1989 |
| GB | 685416 | 1/1953 | JP | 62320631 | 6/1989 |
| GB | 702892 | 1/1954 | JP | 2017474 | 1/1990 |
| GB | 715226 | 9/1954 | JP | 3245748 | 2/1990 |
| GB | 723457 | 2/1955 | JP | 4179107 | 11/1990 |
| GB | 739962 | 11/1955 | JP | 318253 | 1/1991 |
| GB | 763761 | 12/1956 | JP | 424909 | 1/1992 |
| GB | 805721 | 12/1958 | JP | 5290947 | 4/1992 |
| GB | 827600 | 2/1960 | JP | 6196343 | 12/1992 |
| GB | 854728 | 11/1960 | JP | 6233442 | 2/1993 |
| GB | 870583 | 6/1961 | JP | 6325629 | 5/1993 |
| GB | 913386 | 12/1962 | JP | 7057951 | 8/1993 |
| GB | 965741 | 8/1964 | JP | 7264789 | 3/1994 |
| GB | 992249 | 5/1965 | JP | 8167332 | 12/1994 |
| GB | 1024583 | 3/1966 | JP | 7161270 | 6/1995 |
| GB | 1053337 | 12/1966 | JP | 8264039 | 11/1995 |
| GB | 1059123 | 2/1967 | JP | 9200989 | 1/1996 |
| GB | 1103099 | 2/1968 | JP | 8036952 | 2/1996 |

| | | | | | | |
|---|---|---|---|---|---|---|
| JP | 8167360 | 6/1996 | | WO | WO9745934 | 12/1997 |
| LU | 67199 | 3/1972 | | WO | WO9745935 | 12/1997 |
| SE | 90308 | 9/1937 | | WO | WO9745936 | 12/1997 |
| SE | 305899 | 11/1968 | | WO | WO9745937 | 12/1997 |
| SE | 255156 | 2/1969 | | WO | WO9745938 | 12/1997 |
| SE | 341428 | 12/1971 | | WO | WO9745939 | 12/1997 |
| SE | 453236 | 1/1982 | | WO | WO9747067 | 12/1997 |
| SE | 457792 | 6/1987 | | WO | WO9834315 | of 1998 |
| SE | 502417 | 12/1993 | | WO | WO9820595 | 5/1998 |
| SU | 266037 | 10/1965 | | WO | WO9820596 | 5/1998 |
| SU | 792302 | 1/1971 | | WO | WO9820597 | 5/1998 |
| SU | 646403 | 2/1979 | | WO | WO 98/20598 | 5/1998 |
| SU | 1019553 | 1/1980 | | WO | WO9820600 | 5/1998 |
| SU | 425268 | 1/1982 | | WO | WO 98/20602 | 5/1998 |
| SU | 694939 | 1/1982 | | WO | WO9821385 | 5/1998 |
| SU | 955369 | 8/1983 | | WO | PCT/FR 98/00468 | 6/1998 |
| SU | 1189322 | 10/1986 | | WO | WO9827634 | 6/1998 |
| SU | 1511810 | 5/1987 | | WO | WO9827635 | 6/1998 |
| WO | WO8202617 | 8/1982 | | WO | WO9827636 | 6/1998 |
| WO | WO8502302 | 5/1985 | | WO | WO9829927 | 7/1998 |
| WO | WO9011389 | 10/1990 | | WO | WO9829928 | 7/1998 |
| WO | WO9012409 | 10/1990 | | WO | WO9829929 | 7/1998 |
| WO | PCT/DE 90/00279 | 11/1990 | | WO | WO9829930 | 7/1998 |
| WO | WO9101059 | 1/1991 | | WO | WO9829931 | 7/1998 |
| WO | WO9101585 | 2/1991 | | WO | WO9829932 | 7/1998 |
| WO | WO9107807 | 3/1991 | | WO | WO9833731 | 8/1998 |
| WO | SE 91/00077 | 4/1991 | | WO | WO9833736 | 8/1998 |
| WO | WO9109442 | 6/1991 | | WO | WO9833737 | 8/1998 |
| WO | WO 91/11841 | 8/1991 | | WO | WO9834238 | 8/1998 |
| WO | WO8115862 | 10/1991 | | WO | WO 98/34239 | 8/1998 |
| WO | WO 91/15755 | 10/1991 | | WO | WO9834240 | 8/1998 |
| WO | WO9201328 | 1/1992 | | WO | WO9834241 | 8/1998 |
| WO | WO9203870 | 3/1992 | | WO | WO9834242 | 8/1998 |
| WO | WO9321681 | 10/1993 | | WO | WO9834243 | 8/1998 |
| WO | WO9406194 | 3/1994 | | WO | WO9834244 | 8/1998 |
| WO | WO9518058 | 7/1995 | | WO | WO9834245 | 8/1998 |
| WO | WO9522153 | 8/1995 | | WO | WO9834246 | 8/1998 |
| WO | WO9524049 | 9/1995 | | WO | WO9834247 | 8/1998 |
| WO | WO9622606 | 7/1996 | | WO | WO9834248 | 8/1998 |
| WO | WO9622607 | 7/1996 | | WO | WO9834249 | 8/1998 |
| WO | PCT/CN 96/00010 | 10/1996 | | WO | WO9834250 | 8/1998 |
| WO | WO9630144 | 10/1996 | | WO | WO9834309 | 8/1998 |
| WO | WO9710640 | 3/1997 | | WO | WO9834312 | 8/1998 |
| WO | WO9711831 | 4/1997 | | WO | WO9834321 | 8/1998 |
| WO | WO9716881 | 5/1997 | | WO | WO9834322 | 8/1998 |
| WO | WO 97/29494 | 8/1997 | | WO | WO9834323 | 8/1998 |
| WO | WO9745288 | 12/1997 | | WO | WO9834325 | 8/1998 |
| WO | WO9745847 | 12/1997 | | WO | WO9834326 | 8/1998 |
| WO | WO9745848 | 12/1997 | | WO | WO9834327 | 8/1998 |
| WO | WO9745906 | 12/1997 | | WO | WO9834328 | 8/1998 |
| WO | WO9745907 | 12/1997 | | WO | WO9834329 | 8/1998 |
| WO | WO9745912 | 12/1997 | | WO | WO9834330 | 8/1998 |
| WO | WO9745914 | 12/1997 | | WO | WO9834331 | 8/1998 |
| WO | WO9745915 | 12/1997 | | WO | WO 98/40627 | 9/1998 |
| WO | WO9745916 | 12/1997 | | WO | WO 98/43336 | 10/1998 |
| WO | WO9745918 | 12/1997 | | WO | WO9917309 | 4/1999 |
| WO | WO9745919 | 12/1997 | | WO | WO9917311 | 4/1999 |
| WO | WO9745920 | 12/1997 | | WO | WO9917312 | 4/1999 |
| WO | WO9745921 | 12/1997 | | WO | WO9917313 | 4/1999 |
| WO | WO9745922 | 12/1997 | | WO | WO9917314 | 4/1999 |
| WO | WO9745923 | 12/1997 | | WO | WO9917315 | 4/1999 |
| WO | WO9745924 | 12/1997 | | WO | WO9917316 | 4/1999 |
| WO | WO9745925 | 12/1997 | | WO | WO9917422 | 4/1999 |
| WO | WO9745926 | 12/1997 | | WO | WO9917424 | 4/1999 |
| WO | WO9745927 | 12/1997 | | WO | WO9917425 | 4/1999 |
| WO | WO9745928 | 12/1997 | | WO | WO9917426 | 4/1999 |
| WO | WO9745929 | 12/1997 | | WO | WO9917427 | 4/1999 |
| WO | WO9745930 | 12/1997 | | WO | WO9917428 | 4/1999 |
| WO | WO9745931 | 12/1997 | | WO | WO9917429 | 4/1999 |
| WO | WO9745932 | 12/1997 | | WO | WO9917432 | 4/1999 |
| WO | WO9745933 | 12/1997 | | WO | WO9917433 | 4/1999 |

| | | |
|---|---|---|
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

J&P Transformer Book 11$^{th}$ Edition;A. C. Franklin et al; owned by Butterworth—Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol 53, No. 1–2, 1980, pp 3–12.

Direct Connection of Generators to HVDC Converters: Main Characteristics and Comparative Advantages; J. Arrillaga et al; *Electra* No. 149, 08/ 1993, pp 19–37.

Our flexible friend article; M. Judge; *New Scientist,* May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No 141, Apr. 1992, pp 34–39.

Development of a Termination for the 77 kV–Class High Tc Superconducting Power Cable; T. Shimonosono et al; IEEE Power Delivery, vol 12, No 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A . Bautista et al; IEEE Applied Superconductivity, vol 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A. Felldin; *ERA* (TEKNIK) Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp16–19.

Canadians Create Conductive Concrete; J. Beaudoin et al; *Science,* vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution,* Dec. 1996, pp 49–54.

Investigation and Use of Asynchronized Machines in Power Systems*; N.I.Blotskii et al; *Elektrichestvo,* No. 12, 1–6, 1985, pp 90–99.

Variable–speed switched reluctance motors; P.J. Lawrenson et al; IEE proc, vol 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6–3–12.

Die Wechselstromtechnik; A. Cour' Springer Verlag, Germany; 1936, pp 586–598.

Insulation systems for superconducting transmission cables; O.Toennesen; Nordic Insulation Symposium, Bergen, 1996, pp 425–432.

MPTC: An economical alternative to universal flow controllers;N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven ( hungarian locomotive V40 1 'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power systems—new concepts and applications; E. Wirth et al; ABB Review Apr. 1997, p 12–20.

Tranforming transformers; S. Mehta et al; *IEEE Spectrum,* Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol 1, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp91–98.

Performance Characteristics of a Wide Range Induction Type Frequency Converter; G.A. Ghoneem; Ieema Journal, Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp1–65.

Design and manufacture of a large superconducting homopolar motor; A.D. Appleton; IEEE Transactions on Magnetics, vol. 19, No. 3, Part 2, May 1983, pp 1048–1050.

Application of high temperature superconductivity to electric motor design; J.S. Edmonds et al; IEEE Transactions on Energy Conversion Jun. 1992, No. 2, pp 322–329.

Power Electronics and Variable Frequency Drives; B. Bimal; IEEE Industrial Electronics—Technology and Applications, 1996, pp.356.

Properties of High Plymer Cement Mortar; M. Tamai et al; *Science & Technology in Japan,* No 63 ; 1977, pp 6–14.

Weatherability of Polymer–Modified Mortars after Ten–Year Outdoor Exposure in Koriyama and Sapporo; Y. Ohama et al; *Science & Technology in Japan No. 63;* 1977, pp 26–31.

SMC Powders Open New Magnetic Applications; M. Persson (Editor); *SMC Update,* vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No 6, Mar. 15, 1988, p. 1882–1888.

Low–intensy laser–triggering of rail–gaps with magnesium–aerosol switching–gases; W. Frey; 11th International Pulse Power Conference, 1997, Baltimore, USA Digest of Technical Papers, p. 322–327.

Shipboard Electrical Insulation; G. L. Moses, 1951, pp2&3.

ABB Elkrafthandbok; ABB AB; 1988 ; pp274–276.

Elkraft teknisk Handbok, 2 Elmaskiner; A. Alfredsson et al; 1988, pp 121–123.

High Voltage Cables in a New Class of Generators Powerformer; M. Leijon et al; Jun. 14, 1999; pp1–8.

Ohne Tranformator direkt ins Netz; Owman et al, ABB, AB; Feb. 8, 1999; pp48–51.

Submersible Motors and Wet–Rotor Motors for Centrifugal Pumps Submerged in the Fluid Handled; K.. Bienick, KSB; Feb. 25, 1988; pp9–17.

High Voltage Generators; G. Beschastnov et al; 1977; vol 48. No. 6 pp1–7.

Eine neue Type von Unterwassermotoren; Electrotechnik und Maschinenbam, 49; Aug. 1931; pp2–3.

Problems in design of the 110–5OokV high–voltage generators; Nikiti et al; World Electrotechnical Congress; Jun. 21–27, 1977; Section 1. Paper #18.

Manufacture and Testing of Roebel bars; P. Marti et al; 1960, Pub.86, vol 8, pp 25–31.

Hydroalternators of 110 to 220 kV Elektrotechn. Obz., vol. 64, No. 3, pp132–136 Mar. 1975; A. Abramov.

Design Concepts for an Amorphous Metal Distribution Transformer, E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol 59, No 12, pp35–40, 1988.

Zur Entwicklung der Tauchpumpenmotoren; A. Schanz; KSB, pp19–24.

Direct Generation of alternating current at high voltages; R. Parsons; IEEE Journal, vol 67 #393, Jan. 15, 1929; pp1065–1080.

Stopfbachslose Umwalzpumpen–ein wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung moderner Tauchpumpen; A. Heumann; 1987.

High capacity synchronous generator having no tooth stator; V.S. Kildishev et al; No. 1, 1977 pp11–16.

Der Asynchronmotor als Antrieb stopfbcichsloser Pumpen; E. Picmaus; Eletrotechnik und Maschinenbay No. 78, pp153–155, 1961.

Low core loss rotating flux transformer; R. F. Krause, et al; American Institute Physics J.Appl.Phys vol. 64 #10 Nov. 1988, pp5376–5378.

An EHV bulk Power transmission line Made with Low Loss XLPE Cable;Ichihara et al; 8/92; pp3–6.

Underground Transmission Systems Reference Book; 1992;pp16–19; pp36–45; pp67–81.

Power System Stability and Control; P. Kundur, 1994; pp23–25;p. 767.

Six phase Synchronous Machine with AC and DC Stator Connections, Part II:Harmonic Studies and a proposed Uninterruptible Power Supply Scheme; R. Schiferl et al.;Aug. 1983 pp 2694–2701.

Six phase Synchronous Machine with AC and DC Stator Connections, Part 1: Equivalent circuit representation and Steady–State Analysis; R. Schiferl et al; Aug. 1983; pp2685–2693.

Reactive Power Compensation; T. Petersson; 1993; pp 1–23.

Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 6OkV; G. Aicholzer; Sep. 1974, pp249–255.

Advanced Turbine–generators—an assessment; A. Appleton, et al; International Conf. Proceedings, Lg HV Elec. Sys. Paris, FR, Aug.–Sep. 1976, vol I, Section 11–02, p. 1–9.

Fully slotless turbogenerators; E. Spooner; Proc., IEEE vol 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

Powerformer ™: A giant step in power plant engineering; Owman et al; CIGRE 1998, Paper 11:1.1.

Thin Type DC/DC Converter using a coreless wire transfomer; K. Onda et al; Proc. IEEE Power Electronics Spec. Conf.; Jun. 1994, pp330–334.

Development of extruded polymer insulated superconducting cable; Jan. 1992.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol 4, No. 9 Sep. 1989.

A study of equipment sizes and constraints for a unified power flow controller; J Bian et al; IEEE 1996.

* cited by examiner

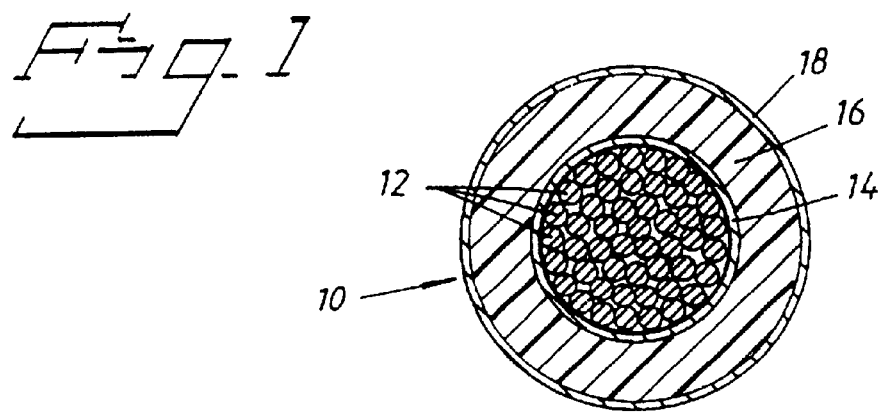
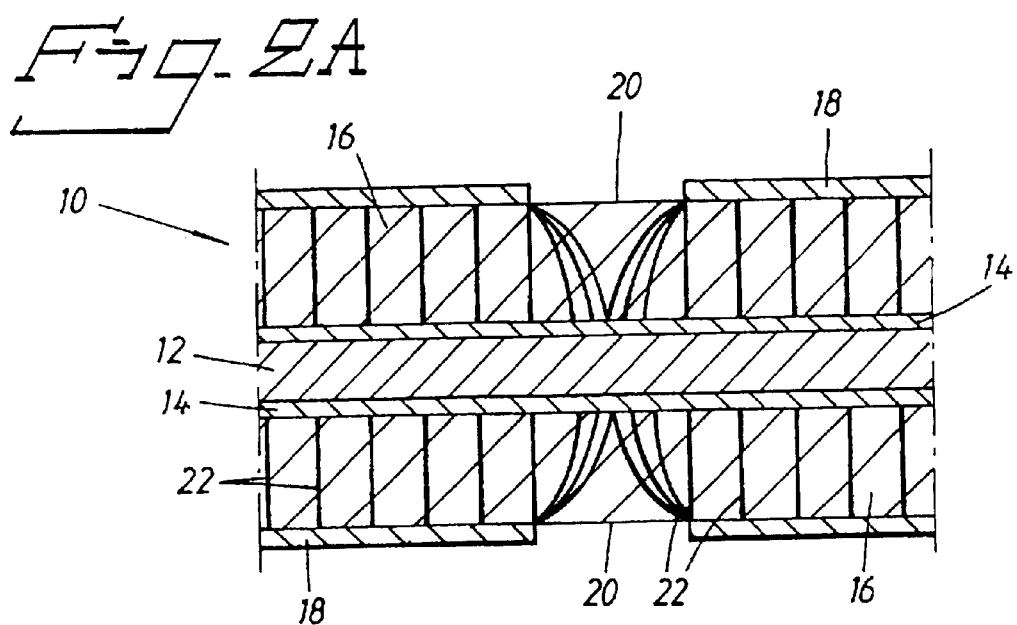
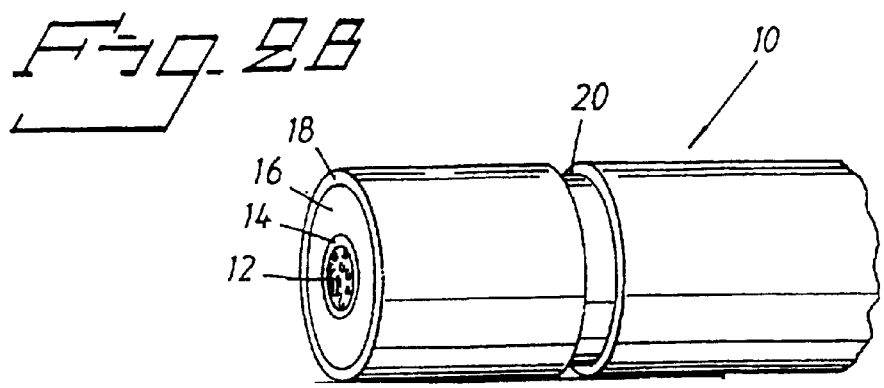

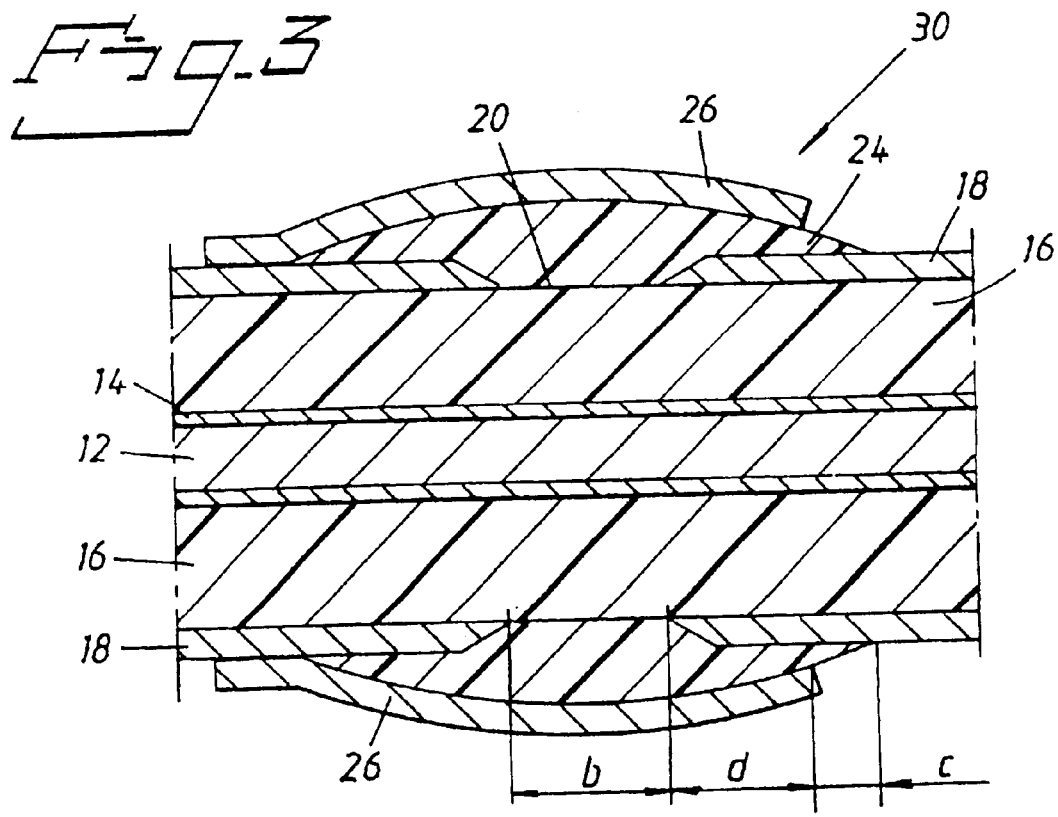
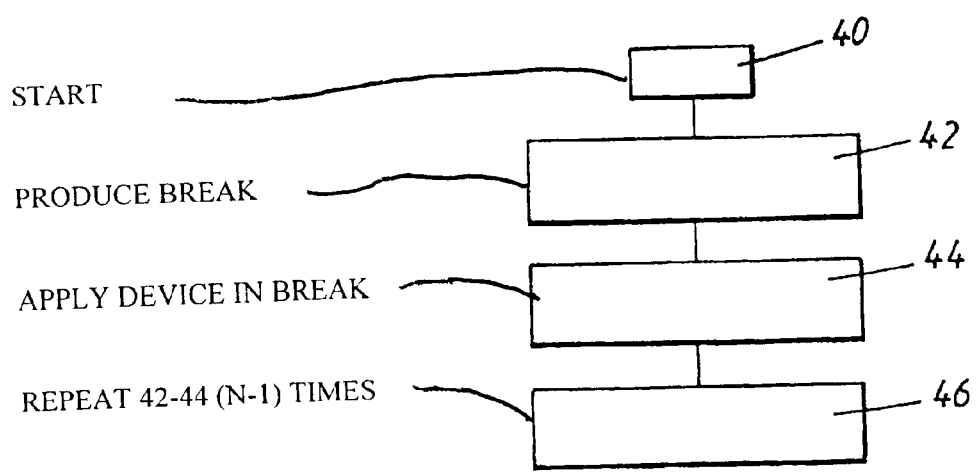
FIG. 5

Fig. 4A
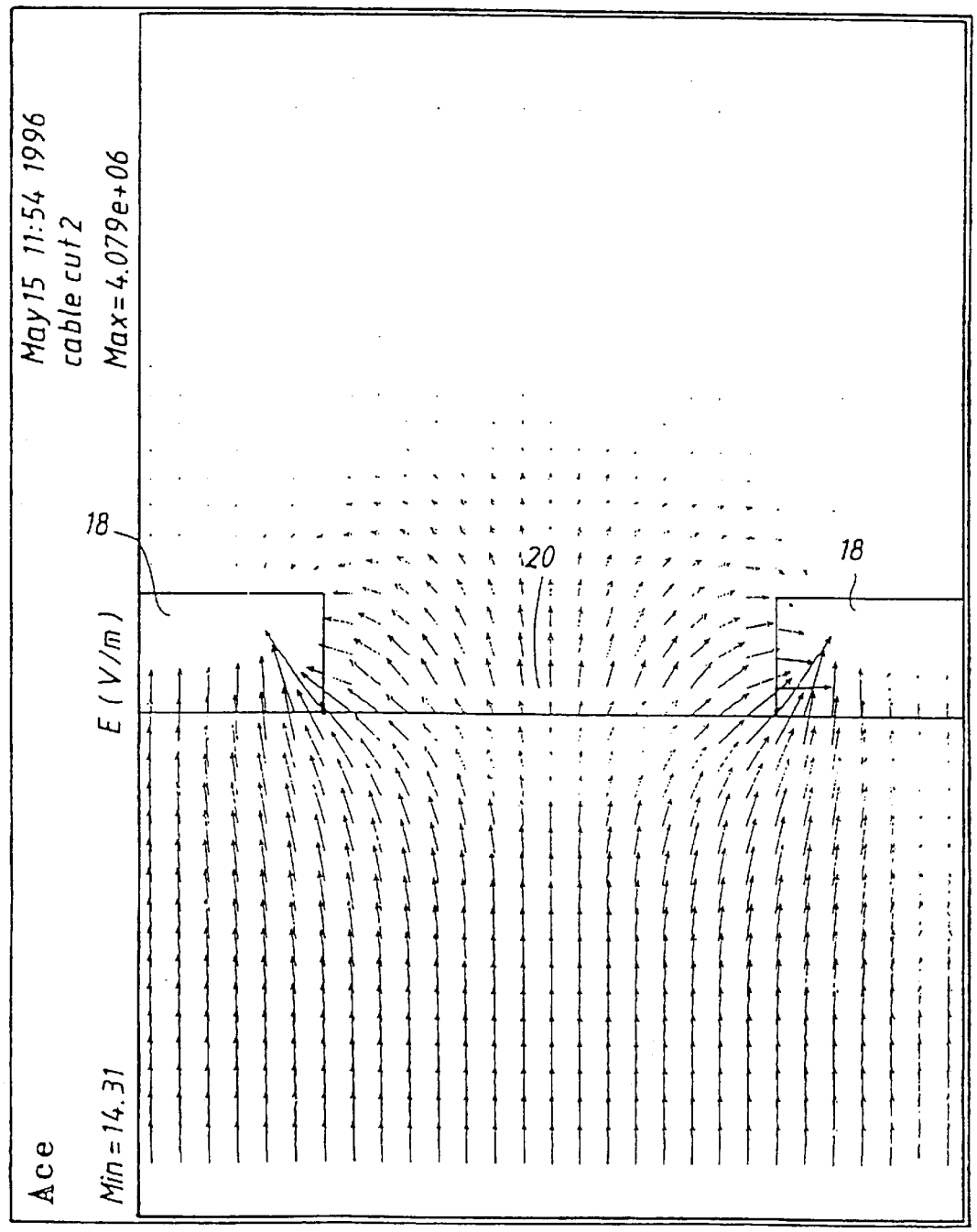

INSULATED CONDUCTOR FOR HIGH-VOLTAGE WINDINGS AND A METHOD OF MANUFACTURING THE SAME

TECHNICAL FIELD

The present invention relates in a first aspect to an insulated conductor for high-voltage windings in rotating electric machines.

A second aspect of the present invention relates to a method of adapting an insulated conductor for high-voltage windings in rotating electric machines.

A third aspect of the present invention relates to a rotating electric machine comprising an insulated conductor of the type described above.

The machine is intended primarily as generator in a power station for generating electric power.

The invention is applicable in rotating electric machines such as synchronous machines. The invention is also applicable in other electric machines such as dual-fed machines, and applications in asynchronous static current cascades, outer pole machines and synchronous flow machines, provided their windings consist of insulated electric conductors of the type described in the introduction, and preferably at high voltages. "High voltages" here refer to electric voltages exceeding 10 kV. A typical working range for an insulated conductor for high-voltage windings according to the invention may be 36–800 kV.

BACKGROUND ART

In order to be able to explain and describe the machine, a brief description of a rotating electric machine will first be given, exemplified on the basis of a synchronous machine. The first part of the description substantially relates to the magnetic circuit of such a machine and how it is constructed according to classical technique. Since the magnetic circuit referred to in most cases is located in the stator, the magnetic circuit below will normally be described as a stator with a laminated core, the winding of which will be referred to as a stator winding, and the slots in the laminated core for the winding will be referred to as stator slots or simply slots.

The stator winding is located in slots in the sheet iron core, the slots normally having a rectangular or trapezoidal cross section as that of a rectangle or a trapezoid. Each winding phase comprises a number of series-connected coil groups connected in series and each coil group comprises a number of series-connected coils connected in series. The different parts of the coil are designated coil side for the part which is placed in the stator and end winding end for that part which is located outside the stator. A coil comprises one or more conductors brought together in height and/or width.

Between each conductor there is a thin insulation, for example epoxy/glass fibre.

The coil is insulated from the slot with a coil insulation, that is, an insulation intended to withstand the rated voltage of the machine to earth. As insulating material, various plastic, varnish and glass fibre materials may be used. Usually, so-called mica tape is used, which is a mixture of mica and hard plastic, especially produced to provide resistance to partial discharges, which can rapidly break down the insulation. The insulation is applied to the coil by winding the mica tape around the coil in several layers. The insulation is impregnated, and then the coil side is painted with a graphite-based paint to improve the contact with the surrounding stator which is connected to earth potential.

The conductor area of the windings is determined by the current intensity in question and by the cooling method used. The conductor and the coil are usually formed with a rectangular shape to maximize the amount of conductor material in the slot. A typical coil is formed of so-called Roebel bars, in which certain of the bars may be made hollow for a coolant. A Roebel bar comprises a plurality of rectangular, parallel-connected copper conductors connected in parallel, which are transposed 360 degrees along the slot. Ringland bars with transpositions of 540 degrees and other transpositions also occur. The transposition is made to avoid the occurrence of circulating currents which are generated in a cross section of the conductor material, as viewed from the magnetic field.

For mechanical and electrical reasons, a machine cannot be made in just any size. The machine power is determined substantially by three factors:

The conductor area of the windings. At normal operating temperature, copper, for example, has a maximum value of 3–3.5 A/mm2.

The maximum flux density (magnetic flux) in the stator and rotor material.

The maximum electric field strength in the insulating material, the so-called dielectric strength.

Polyphase ac windings are designed either as single-layer or two-layer windings. In the case of single-layer windings, there is only one coil side per slot, and in the case of two-layer windings there are two coil sides per slot. Two-layer windings are usually designed as diamond windings, whereas the single-layer windings which are relevant in this connection may be designed as a diamond winding or as a concentric winding. In the case of a diamond winding, only one coil span (or possibly two coil spans) occurs, whereas flat windings are designed as concentric windings, that is, with a greatly varying coil span. By coil span is meant the distance in circular measure between two coil sides belonging to the same coil, either in relation to the relevant pole pitch or in the number of intermediate slot pitches. Usually, different variants of chording are used, for example short-pitching pitch, to give the winding the desired properties.

The type of winding substantially describes how the coils in the slots, that is, the coil sides, are connected together outside the stator, that is, at the end windings ends.

Outside the stacked sheets of the stator, the coil is not provided with a painted semiconducting earth-potential layer. The end winding end is normally provided with an E-field control in the form of so-called corona protection varnish intended to convert a radial field into an axial field, which means that the insulation on the end windings ends occurs at a high potential relative to earth. This sometimes gives rise to corona in the end-winding-end region, which may be destructive. The so-called field-controlling points at the end windings ends entail problems for a rotating electric machine.

Normally, all large machines are designed with a two-layer winding and equally large coils. Each coil is placed with one side in one of the layers and the other side in the other layer. This means that all the coils cross each other in the end winding end. If more than two layers are used, these crossings render the winding work difficult and deteriorate the end winding end.

It is generally known that the connection of a synchronous machine/generator to a power network must be made via a AE/YD-connected so-called step-up transformer, since the voltage of the power network normally lies at a higher level than the voltage of the rotating electric machine. Together with the synchronous machine, this transformer thus constitutes integrated parts of a plant. The transformer constitutes an extra cost and also has the disadvantage the advantage that the total efficiency of the system is lowered. If it were possible to manufacture machines for considerably higher voltages, the step-up transformer could thus be omitted. During the last few decades, there have been increasing requirements for rotating electric machines for higher voltages than for what has previously been possible to design. The maximum voltage level which, according to the state of the art, has been possible to achieve for synchronous machines with a good yield in the coil production is around 25–30 kV.

Certain attempts to a new approach as regards the design of synchronous machines are described, inter alia, in an article entitled "Water-and-oil-cooled Turbogenerator TVM-300" in J. Elektrotechnika, No. 1, 1970, pp. 6–8, in U.S. Pat. No. 4,429,244 "Stator of Generator" and in Russian patent document CCCP Patent 955369.

The water- and oil-cooled synchronous machine described in J. Elektrotechnika is intended for voltages up to 20 kV. The article describes a new insulation system consisting of oil/paper insulation, which makes it possible to immerse the stator completely in oil. The oil can then be used as a coolant while at the same time using it as insulation. To prevent oil in the stator from leaking out towards the rotor, a dielectric oil-separating ring is provided at the internal surface of the core. The stator winding is made from conductors with an oval hollow shape provided with oil and paper insulation. The coil sides with their insulation are secured to the slots made with rectangular cross section by means of wedges. As coolants coolant oil is used both in the hollow conductors and in holes in the stator walls. Such cooling systems, however, entail a large number of connections of both oil and electricity at the coil ends. The thick insulation also entails an increased radius of curvature of the conductors, which in turn results in an increased size of the winding overhang.

The above-mentioned US patent relates to the stator part of a synchronous machine which comprises a magnetic core of laminated sheet with trapezoidal slots for the stator winding. The slots are tapered since the need for insulation of the stator winding is less towards the interior of the rotor where that part of the winding which is located nearest the neutral point is located. In addition, the stator part comprises a dielectric oil-separating cylinder nearest the inner surface of the core. This part may increase the magnetization requirement relative to a machine without this ring. The stator winding is made of oil-immersed cables with the same diameter for each coil layer. The layers are separated from each other by means of spacers in the slots and secured by wedges. What is special for the winding is that it comprises two so-called half-windings connected in series. One of the two half-windings is located, centered, inside an insulating sleeve. The conductors of the stator winding are cooled by surrounding oil. Disadvantages with such a large quantity of oil in the system are the risk of leakage and the considerable amount of cleaning work which may result from a fault condition. Those parts of the insulating sleeve which are located outside the slots have a cylindrical part and a conical termination reinforced with current-carrying layers, the purpose of which is to control the electric field strength in the region where the cable enters the end winding.

From CCCP 955369 it is clear, in another attempt to raise the rated voltage of the synchronous machine, that the oil-cooled stator winding comprises a conventional high-voltage cable with the same dimension for all the layers. The cable is placed in stator slots formed as circular, radially located openings corresponding to the cross-section area of the cable and the necessary space for fixing and for coolant. The different radially located layers of the winding are surrounded by and fixed in insulating tubes. Insulating spacers fix the tubes in the stator slot. Because of the oil cooling, an internal dielectric ring is also needed here for sealing the oil coolant off against the internal air gap. The disadvantages of oil in the system described above also apply to this design. The design also exhibits a very narrow radial waist between the different stator slots, which implies a large slot leakage flux which significantly influences the magnetization requirement of the machine.

A report from Electric Power Research Institute, EPRI, EL-3391, from 1984 describes a review of machine concepts for achieving a higher voltage of a rotating electric machine with the purpose of being able to connect a machine to a power network without an intermediate transformer. Such a solution, judging from is judged by the investigation to provides good efficiency gains and great economic advantages. The main reason for considering it was considered possible in 1984 to start developing generators for direct connection to power networks was that at the time a superconducting rotor had been produced. The large magnetization capacity of the superconducting field makes it possible to use an air gap winding with a sufficient insulation thickness to withstand the electrical stresses. By combining the most promising concept, according to the project, of designing a magnetic circuit with a winding, a so-called monolith cylinder armature, a concept where the winding comprises two cylinders of conductors concentrically enclosed in three cylindrical insulating casings and the whole structure being fixed to an iron core without teeth, it was judged that a rotating electric machine for high voltage could be directly connected to a power network. The solution meant that the main insulation had to be made sufficiently thick to cope with network-to-network and network-to-earth potentials. The insulation system which, after a review of all the technique known at the time, was judged to be necessary to manage an increase to a higher voltage was that which is normally used for power transformers and which consists of dielectric-fluid-impregnated cellulose press board. Obvious disadvantages with the proposed solution are that, in addition to requiring a superconducting rotor, it requires a very thick insulation which increases the size of the machine. The end windings ends must be insulated and cooled with oil or freons to control the large electric fields in the ends. The whole machine must be hermetically enclosed to prevent the liquid dielectric from absorbing moisture from the atmosphere.

When manufacturing rotating electric machines according to the state of the art, the winding is manufactured with conductors and insulation systems in several steps, whereby the winding must be preformed prior to mounting on the magnetic circuit. Impregnation for preparing the insulation system is performed after mounting of the winding on the magnetic circuit.

SUMMARY OF THE INVENTION

It is an object of the invention to be able to manufacture a rotating electric machine for high voltage without any complicated preforming of the winding and without having to impregnate the insulation system after mounting of the winding.

To increase the power of a rotating electrical machine, it is known to increase the current in the AC coils. This has been achieved by optimizing the quantity of conducting material, that is, by close-packing of rectangular conductors in the rectangular rotor slots. The aim has been to handle the increase in temperature resulting from this by increasing the quantity of insulating material and using more temperature-resistant and hence more expensive insulating materials. The high temperature and field load on the insulation has also caused problems with the life of the insulation. In the relatively thick-walled insulating layers which are used for high-voltage equipment, for example impregnated layers of mica tape, partial discharges, PD, constitute a serious problem. When manufacturing these insulating layers, cavities, pores, and the like, will easily arise, in which internal corona discharges arise when the insulation is subjected to high electric field strengths. These corona discharges gradually degrade the material and may lead to electric breakdown through the insulation.

The present invention is based on the realization that, to be able to increase in the power of a rotating electrical machine in a technically and economically justifiable way, this must be achieved by ensuring that the insulation is not broken down by the phenomena described above. This can be achieved according to the invention by using as insulation layers made in such a way that the risk of cavities and pores is minimal, for example extruded layers of a suitable solid insulating material, such as thermoplastic resins, cross linked thermoplastic resins, rubber such as silicone rubber, etc. In addition, it is important that the insulating layer comprises an inner layer, surrounding the conductor, with semiconducting properties and that the insulation is also provided with at least one additional outer layer, surrounding the insulation, with semiconducting properties. By Semiconducting properties is meant in this context is a material which has a considerably lower conductivity than an electric conductor but which does not have such a low conductivity that it is an insulator. By using only insulating layers which may be manufactured with a minimum of defects and, in addition, providing the insulation with an inner and an outer semiconducting layer, it can be ensured that the thermal and electric loads are reduced. The insulating part with at least one adjoining semiconducting layer should have essentially the same coefficient of thermal expansion. At temperature gradients, defects caused by different temperature expansion in the insulation and the surrounding layers should not arise. The electric load on the material decreases as a consequence of the fact that the semiconducting layers around the insulation will constitute equipotential surfaces and that the electrical field in the insulating part will be distributed relatively evenly over the thickness of the insulation. The outer semiconducting layer may be connected to a chosen potential, for example earth potential. This means that, for such a cable, the outer casing of the winding in its entire length may be kept at, for example, earth potential. The outer layer may also be cut off at suitable locations along the length of the conductor and each cut-off partial length may be directly connected to a chosen potential. Around the outer semiconducting layer there may also be arranged other layers, casings and the like, such as a metal shield and a protective sheath.

Further knowledge gained in connection with the present invention is that increased current load leads to problems with electric (E) field concentrations at the corners at a cross section of a coil and that this entails large local loads on the insulation there. Likewise, the magnetic (B) field in the teeth of the stator will be concentrated at the corners. This means that magnetic saturation arises locally and that the magnetic core is not utilized in full and that the wave form of the generated voltage/current will be distorted. In addition, eddy-current losses caused by induced eddy currents in the conductors, which arise because of the geometry of the conductors in relation to the B field, will entail additional disadvantages in increasing current densities. A further improvement of the invention is achieved by making the coils and the slots in which the coils are placed essentially circular instead of rectangular. By making the cross section of the coils circular, these will be surrounded by a constant B field without concentrations where magnetic saturation may arise. Also the E field in the coil will be distributed evenly over the cross section and local loads on the insulation are considerably reduced. In addition, it is easier to place circular coils in slots in such a way that the number of coil sides per coil group may increase and an increase of the voltage may take place without the current in the conductors having to be increased. The reason for this being that the cooling of the conductors is facilitated by, on the one hand, a lower current density and hence lower temperature gradients across the insulation and, on the other hand, by the circular shape of the slots which entails a more uniform temperature distribution over a cross section. Additional improvements may also be achieved by composing the conductor from smaller parts, so-called strands. The strands may be insulated from each other and only a small number of strands may be left uninsulated and in contact with the inner semiconducting layer, to ensure that this is at the same potential as the conductor.

The advantages of using a rotating electric machine according to the invention are that the machine can be operated at overload for a considerably longer period of time than what is usual for such machines without being damaged. This is a consequence of the composition of the machine and the limited thermal load of the insulation. It is, for example, possible to load the machine with up to 100% overload for a period exceeding 15 minutes and up to two hours.

One embodiment according to the invention is that the magnetic circuit of the rotating electric machine comprises a winding of a threaded cable with one or more extruded insulated conductors with solid insulation with a semiconducting layer both at the conductor and the casing. The outer semiconducting layer may be connected to earth potential. To be able to cope with the problems which arise in case of direct connection of rotating electric machines to all types of high-voltage power networks, a machine according to the invention has a number of features which distinguish it from the state of the art.

As described above, a winding for a rotating electric machine may be manufactured from a cable with one or more extruded insulated conductors with solid insulation with a semiconducting layer both at the conductor and at the casing. Some typical examples are a XLPE cable or a cable with EP rubber insulation. A further development of a conductor composed of strands is possible in that it is possible to insulate the strands with respect to each other in order thus to reduce the amount of eddy current losses in the conductor. One or a few strands may be left uninsulated to ensure that the semiconducting layer which surrounds the conductor is at the same potential as the conductor.

It is known that a high-voltage cable for transmission of electric energy is composed of conductors with solid extruded insulation with an inner and an outer semiconductor part. In the process of transmitting electric energy it was required that the insulation should be free from defects. During transmission of electric energy, the starting-point has long been that the insulation should be free from defects. When using high-voltage cables for transmission of electric energy, the aim was not been to maximize the current through the cable since space is no limitation for a transmission cable. Insulation of a conductor for a rotating electric machine may be applied in some other way than by means of extrusion, for example by spraying or the like. It is important, however, that the insulation should have no defects through the whole cross section and should possess similar thermal properties. The semiconducting layers may be supplied with the insulation in connection with the insulation being applied to the conductors.

Preferably, cables with a circular cross section are used. Among other things, to obtain a better packing density, cables with a different cross section may be used. To build up a voltage in the rotating electric machine, the cable is arranged in several consecutive turns in slots in the magnetic core. The winding can be designed as a multi-layer concentric cable winding to reduce the number of end-winding-end crossings. The cable may be made with tapered insulation to utilize the magnetic core in a better way, in which case the shape of the slots may be adapted to the tapered insulation of the winding.

A significant advantage of a rotating electrical machine according to the invention is that the E field is near zero in the end-winding-end region outside the outer semiconductor and that with the outer casing at earth potential, the electric field need not be controlled. This means that no field concentrations can be obtained, neither within sheets, in end-winding-end regions or in the transition between.

The present invention also relates to a method for manufacturing the magnetic circuit and, in particular, the winding. The method for manufacturing comprises placing the winding in the slots by threading a cable into the openings in the slots in the magnetic core (FIG. 6). Since the cable is flexible, it can be bent and this permits a cable length to be located in several turns in a coil. The end windings ends will then consist of bending zones in the cables. The cable may also be joined in such a way that its properties remain constant over the cable length. This method entails considerable simplifications compared with the state of the art. The so-called Roebel bars are not flexible but must be preformed into the desired shape. Impregnation of the coils is also an exceedingly complicated and expensive technique when manufacturing rotating electric machines today.

This is achieved with an insulated conductor for high-voltage windings in rotating electric machines as defined in claim 1, and with a method of adapting an insulated conductor for high-voltage windings in rotating electric machines as defined in claim 9, and also with rotating electric machines comprising an insulated conductor of the type described above according to claim 8. The high-voltage cable according to the present invention comprises one or more strands surrounded by a first semi-conducting layer. This first semi-conducting layer is in turn surrounded by a first insulating layer, which is surrounded by a second semi-conducting layer. This second semi-conducting layer is earthed at least two different points along the high-voltage cable. The part of the cable that lies in the stator slots must be electrically insulated from the magnetic steel of the stator. Between each pair of earthed points along the high-voltage cable, the electric contact is broken in the second semi-conducting layer. At each such break in the second semi-conductive layer a device is arranged to reduce amplification of the electric field strength at said breaks.

According to the invention, the method of adapting an insulated conductor for high-voltage windings in rotating electric machines comprises the steps of:

breaking the electric contact in the second semi-conductive layer between each pair of earthed points; and at each of said breaks in the second semi-conductive layer arranging a device to reduce amplification of the electric field strength at said break.

Thanks to the above method and the high-voltage cable according to the invention, a high-voltage cable is obtained with no heat losses caused by induced voltages in the outer semi-conducting layer. A high-voltage cable is obtained in which the risk of electric breakthrough has been minimized.

The invention will now be explained in more detail in the following description of preferred embodiments, with reference to the accompanying drawings.

BRIEF DESCRIPTION OF THE DRAWINGS

FIG. 1 shows a cross section through a high-voltage cable;

FIG. 2A shows a view, partly in section, of a high-voltage cable with a break in the second semi-conducting layer, in order to illustrate amplification of the electric field at the edges of the break; and FIG. 2B shows a view in perspective of a part of the cable revealed in FIG. 2A;

FIGS. 3 shows a cross section along the longitudinal axis of a high-voltage cable according to the present invention;

FIG. 4A shows the electric field image calculated on a high-voltage cable with a break in the second semi-conducting layer;

FIG. 5 shows a flowchart for the method of adapting a high-voltage cable according to the invention.

DETAILED DESCRIPTION OF EMBODIMENTS OF THE PRESENT INVENTION

Figure 4B:
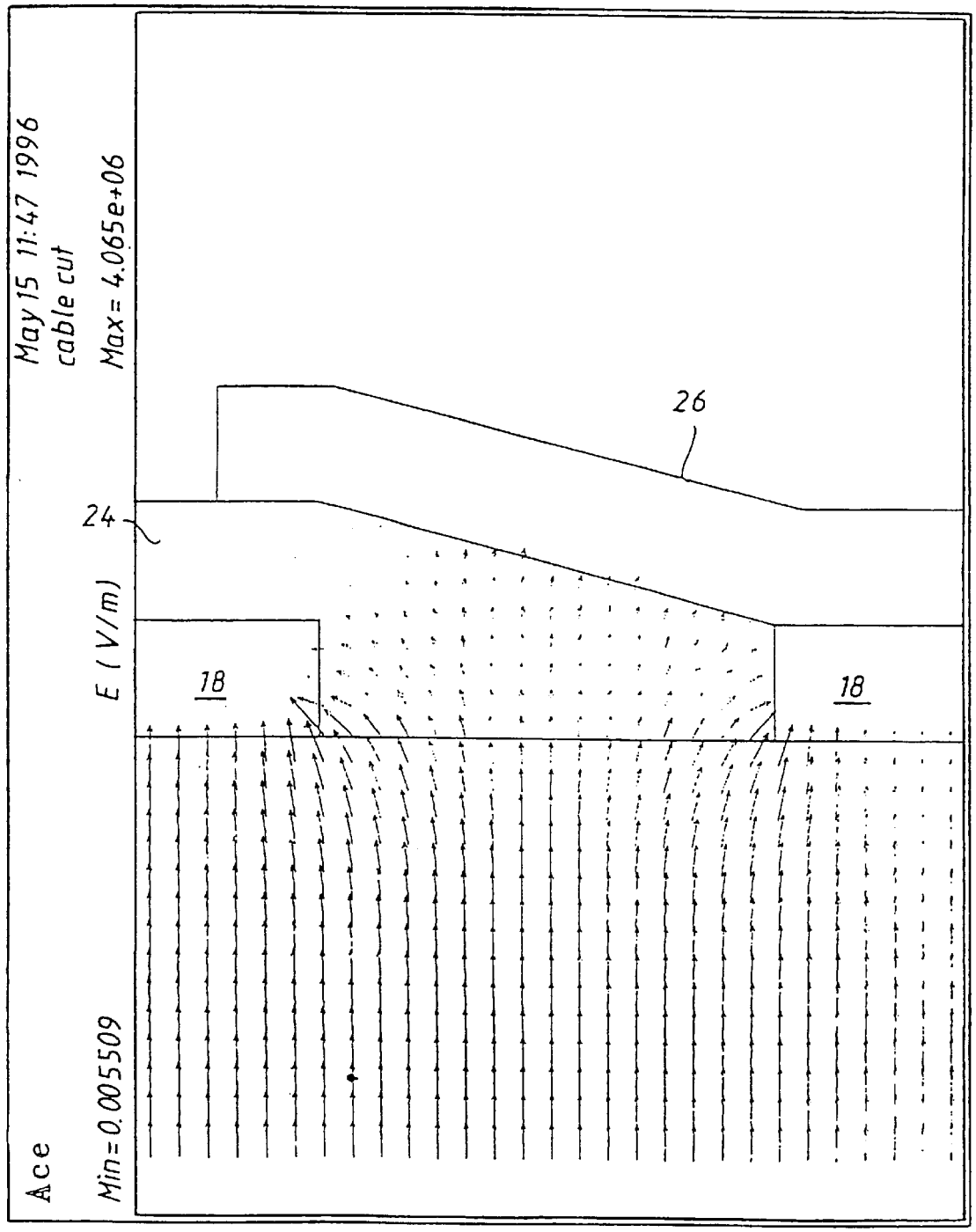
FIG. 4B shows the electric field image calculated on a high-voltage cable according to the present invention.

FIG. 1 shows a cross-sectional view of a high-voltage cable 10 used traditionally for transmitting electric power. The high-voltage cable 10 shown may be a standard XLPE-cable 145 kV but without sheath or screen. The high-voltage cable 10 comprises an electric conductor which may consist of one or more strands 12 of copper (Cu), for instance, having circular cross section. These strands 12 are arranged in the middle of the high-voltage cable 10. Around the strands 12 is a first semi-conducting layer 14, and around the first semi-conducting layer 14 is a first insulating layer 16, e.g. XLPE insulation. Around the first insulating layer 16 is a second semiconducting layer 18.

FIG. 2A shows a view, partially in section, of a high-voltage cable with a break in the second semi-conducting layer, in order to illustrate the amplification of the electric field at the edges of the break. The section shown in FIG. 2A is along the longitudinal axis of the high-voltage cable. FIG. 2B shows a view in perspective of a part of the cable shown in FIG. 2A. In FIGS. 2A and B equivalent parts have been given the same designations as in FIG. 1. The strands 12 are shown only schematically in FIG. 2A. As can be seen in FIGS. 2A and B, the second semi-conducting layer 18 has been removed in a ring around the periphery of the high-voltage cable 10 so that a groove 20 is formed. The first insulating layer 16 is thus exposed in the groove 20. This break in the electric contact in the second semi-conducting layer 18 between two earthed points, ensures that no current will flow and therefore no heat losses will occur caused by induced voltages. However, all interruptions in the second semi-conducting layer 18 gives rise to an increase in the electric field strength at the edges of the break. As can be seen in FIG. 2, the electric field lines have been drawn in (indicated by the designation 22). A concentration of field lines 22 prevails at the edges of the groove 20, indicating that the electric field strength increases sharply there. Unfortunately this increases the risk of electric breakdown which should be avoided.

FIG. 3 shows a cross-sectional view along the longitudinal axis of a high-voltage cable according to the present invention. Like the high-voltage cable 10 in FIG. 1, the high-voltage cable 30 comprises strands 12, a first conducting layer 14, a first insulating layer 16 and a second semi-conducting layer 18. As can be seen in FIG. 3 the second semiconducting layer 18 has been removed in a ring around the periphery in order to form a groove 20, the first insulating layer 16 having been exposed. As can be seen in FIG. 3 the groove 20 has bevelled edges, i.e. the groove 20 is wider at the upper edges of the semi-conducting layer 18 than at the first insulating layer 16. The groove 20 may have straight edges, for instance, although bevelled edges are advantageous. In FIG. 3 the distance between the edges of the second semi-conducting layer 18 at the first insulating layer 16 has been designated b. The width b of the groove 20 is preferably 4 mm. The high-voltage cable 30 also comprises a second insulating layer 24 applied on the groove 20 so that it fills the groove. The reason for having bevelled edges in the groove 20 is so that no cavities are obtained at the edges when the second insulating layer 24 is formed by filling the groove 20 with a suitable insulating material, e.g. insulating self-amalgamating EPDM tape such as insulating tape IV-tejp®, IA 2332 from ABB Kabeldon. The second insulating layer 24 also covers the bevelled edges of the second semiconducting layer 18 and a part of the second semi-conducting layer 18 beside the bevelled edges. The high-voltage cable 30 also comprises a third semi-conducting layer 26, e.g. in the form of tape such as semi-conducting tape, HL-tejp®, IA 2352 from ABB Kabeldon, which is applied over the second insulating layer 24 in such a manner that the third semi-conducting layer 26 at one end covers one edge of the second insulating layer 24 and is in electric contact with the second semi-conducting layer 18. At its other end the third semi-conducting layer 26 does not cover the other end of the second insulating layer 24, but instead terminates a distance c from the other edge of the insulating layer 24. The thickness of the second insulating layer 24 should be at least 1 mm at the edge where the third semi-conducting layer 26 does not cover the second insulating layer 24. On the other hand, the third serif-conducting layer 26 at this its other end shall extend over (overlap) the second semi-conducting layer 18 situated beneath the second insulating layer 24. The distance between the edge of the third semi-conducting layer 26 and the edge of the second semi-conducting layer 18 in the longitudinal direction of the cable 30 is d, as shown in FIG. 3. The third semi-conducting layer 26 should have a thickness of at least 1 mm. A groove 20 with a second insulating layer 24 and a third semi-conducting layer 26 arranged in the manner shown in FIG. 3 exists between each pair of earthed points along the length of the high-voltage cable 30. The number of grooves 20 with devices 24, 26 is thus the number of earthed points minus one. Thus if the number of earthed points is N, the number of grooves 20 and devices 24, 26 will be N−1.

FIG. 4A shows the electric field calculated on a high-voltage cable with breaks in the semi-conducting layer, i.e. as the high-voltage cable shown in FIGS. 2A and 2B. FIG. 4A shows the cable 10 schematically in section, revealing the second semiconducting layer 18 and the groove 20. The arrows indicate the electric field strength E(V/m), where the length of the arrows is proportional to the field strength. As can be seen in FIG. 4A, the electric field strength is greatest at the edges of the groove 20. The maximum field strength at the corners is 4 kV/mm.

FIG. 4B shows the electric field calculated on a high-voltage cable 30 according to the present invention, i.e. according to FIG. 3. FIG. 4B shows the cable 30 schematically in section, revealing the second semi-conducting layer 18, the groove 20, the second insulating layer 24 and the third semi-conducting layer 26. The arrows indicate the electric field strength E(V/m) where the length of the arrows is proportional to the field strength. As can be seen in FIG. 4B the electric field strength at the edges of the groove 20 is not as great as in FIG. 4A. The maximum field strength at the corners is 2.3 kV/mm. By arranging devices 24, 26 (e.g. consisting of a second insulating layer 24 and a third semi-conducting layer 26) at the break 20, therefore, the maximum field strength at the corners can be reduced from 4 kV/mm to 2.3 kV/mm. This greatly reduces the risk of electric breakthrough. At the same time no heat losses are sustained caused by induced voltages.

FIG. 5 shows a flowchart for a method of adapting a high-voltage cable for high-voltage windings in rotating electric machines according to the invention. A high-voltage cable 10 according to FIG. 1 is used, said cable 10 comprising an electric conductor consisting of one or more strands 12, a first semi-conducting layer 14, a first insulating 16 and a second serif-conducting layer 18. This second semiconducting layer 18 will be earthed at least two different points along the high-voltage cable. The flowchart starts at the block 40. The next step, at block 42, is to produce a break 20 in the electric contact in the second semi-conducting layer 18 between each earthing point. If there are N earthed points along the high-voltage cable, therefore, there will be N−1 breaks 20 in the semi-conducting layer 18. Thereafter, at block 44, a device 24, 26 is applied to each break 20 in the second semi-conducting layer 18 in order to reduce amplification of electric field strength at said break 20. Blocks 42 and 44 are thus repeated N−1 times before the end of the procedure is reach at block 46. The breaks 20 are produced by removing the second semi-conducting layer 18 around the periphery of the high-voltage cable, down as far as the first insulating layer 16 so that grooves 20 are formed, flanked by the second semi-conducting layer 18. The edges of the grooves 20 are suitably bevelled as shown in FIG. 3. Over each groove 20 a second insulating layer 24 is applied. This layer 24 also covers a part of the second semi-conducting layer 18 on both sides of the groove 20. Thereafter a third semi-conducting layer 26 is applied on the second insulating layer 24, which at one end covers one edge of the second insulating layer 24 and is in electric contact with the second semi-conducting layer 18. At its other end the third serif-conducting layer 26 does not cover the other edge of the insulating layer 24 but extends over a part of the second semi-conducting layer 18 situated beneath the second insulating layer 24. (See FIG. 3)

Figure 6:
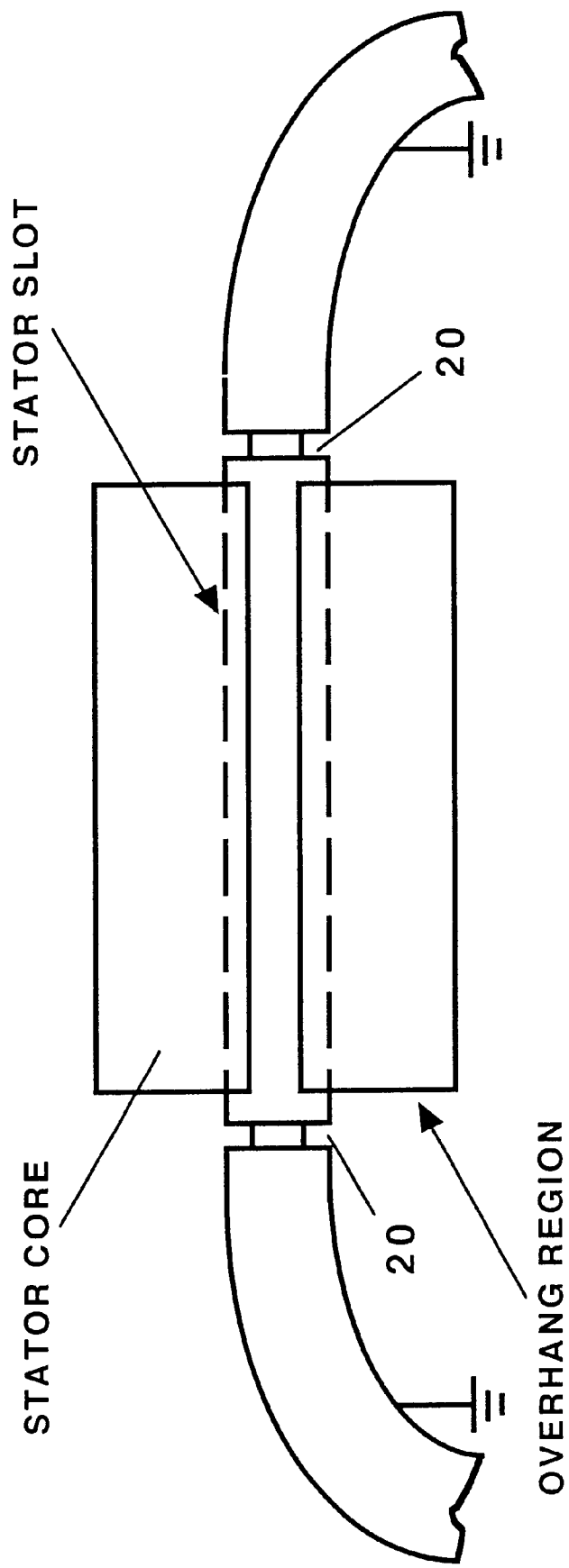
FIG. 6 shows a schematic illustration of stator in a rotating electric machine having slots and a high-voltage cable winding in accordance with the present invention.

The insulated conducor 10 (FIG. 6) is located in a stator slot in the stator core, which has an overhang region at the ends of the stator. The second semi-conductive layer is insulated from the stator in the stator slot and the second semi-conductive layer 18 has at least one break 20 and one grounding point in the overhang region for each slot that the cable passes through.

The invention is not limited to the embodiments shown. Several variations are possible within the scope of the appended claims.

What is claimed is:

1. An insulated conductor for high-voltage windings in electric machines comprising:

a conductor comprising a flexible cable formed of one or more strands, an inner, first semi-conductive layer surrounding the strands, a first insulating layer surrounding the inner first semi-conductive layer and an outer, second semi-conductive layer surrounding the first insulating layer, said second semi-conductive layer including at least two different earth points along the insulated conductor, the second semi-conductive layer including breaks comprising an electrical discontinuity having spaced apart edges forming a gap each of said breaks being located between the earth points, and a shielding device located over each of said breaks and being coupled to one of the edges of the discontinuity and extending across the gap and overlapping the other edge being in radially spaced relation therewith for reducing amplification of the electric field strength produced at said brakes.

2. An insulated conductor for high-voltage windings in rotating electric machines comprising:

a conductor formed of one or more strands, and inner, first semi-conductive layer surrounding the strands, a first insulating layer surrounding the inner, first semi-conductive layer and an outer, second semi-conductive layer including at least two different earth points along the insulated conductor, the second semi-conductive layer includes breaks comprising an electrical discontinuity between the earth points, and a shielding device located across each break and being in contact with the outer layer on one side of each break, extending across and overlapping the break and being in spaced relation with said other side of the break for reducing amplification of the electric field strength produced at each break when the conductor is energized.

3. An insulated conductor as claimed in claim 2 in a machine having a stator formed with stator slots for receiving the insulated conductor and an overhang region, and where the second semi-conductive layer is electrically insulated from the stator and the second semi-conductive layer has at least one of said breaks and one of said earth points in the overhang region for each stator slot that the insulated conductor passes through.

4. An insulated conductor as claimed in claim 2, wherein each electrical discontinuity in the second semi-conductive layer is formed by removal of a portion of the second semi-conductive layer is around the periphery of the insulated conductor down to the first insulating layer forming grooves flanked by the second semi-conductive layer.

5. An insulated conductor as claimed in claim 4 wherein each of the grooves exposes a portion of the first insulating layer and the shielding device comprises a second insulating layer of a selected length having ends, said second insulating layer arranged over each groove, covering the external portion of the first insulating layer, said second insulating layer covering a part of the second semi-conductive layer flanking each groove, and a third semi-conductive layer of a selected length having a contact end and a free end, the contact end covering one end of the second insulating layer and being in electric contact with the second semi-conductive layer and the free end not covering the other end of the second insulating layer, the free end extending over a part of the second semi-conductive layer a distance sufficient to cover the groove and being out of contact with said second semi-conducting layer.

6. An insulated conductor as claimed in claim 5, wherein the ends of the second semi-conductive layer are beveled such that the grooves have a minimum thickness at the first insulating layer.

7. An insulated conductor as claimed in claim 6, wherein the contact end of the third semi-conductive layer is in mechanical contact with the second semi-conductive layer, and the free end of the third semi-conductive layer is not in mechanical or electrical contact with the second semi-conductive layer.

8. An insulated conductor as claimed in claim 7 wherein the second insulating layer comprises a insulating EPDM tape.

9. An insulated conductor as claimed in claim 8, wherein the third semi-conductive layer comprises a semi-conducting rubber-based tape.

10. An insulated conductor as claimed in claim 2, wherein each break comprises a circumferential groove formed through the second semi-conducting layer said groove having a selected length defined by flanking end portions of the second semi-conductive layer.

11. A method of adapting an insulated conductor for high-voltage windings in electric machines, said insulated conductor comprising one or more conductive strands an inner, first semi-conductive layer surrounding the strands, a first insulating layer surrounding the inner, first semi-conductive layer and an outer, second semi-conductive layer surrounding the first insulating layer, said second semi-conductive layer has in use at least two earth points along the insulated conductor comprising the steps of:

producing a break in the second semi-conductive layer between each of the at least two earth points by removing the second semi-conductive layer around the periphery of the insulated conductor down as far as the first insulating layer so that grooves are produced flanked by the second semi-conductive layer; and arranging a shielding device in the second semi-conductive layer across the groove by contacting a third semi-conducting outer layer in one side of the groove and spacing a free end of the semi-conducting layer in spaced overlapping relation with the other side of the groove to reduce amplification of the electric field strength at each side break.

12. A method as claimed in claim 11, wherein each break is produced by removing the second semi-conductive layer around the periphery of the insulated conductor down as far as the first insulating layer so that grooves are produced flanked by the second semi-conductive layer.

13. A method as claimed in claim 11, wherein the step of applying and shielding devices comprises the steps of:

applying a second insulating layer over each groove in such a manner as to cover part of the second semi-conductive layer over the length of each groove; and applying the third semi-conductive layer on the second insulating layer in such a manner that the third semi-conductive layer covers one edge of the second insulating layer and has an end in electric contact with the second semi-conductive layer and has a free end that does not cover the edge of the other edge of the second insulating layer but extends over a part of the second semi-conductive layer situated beneath the second insulating layer out of contact therewith.

14. An insulated conductor for high-voltage windings in rotating electric machines comprising:

a conductor formed of one or more strands, an inner, first semi-conductive layer surrounding the strands, a first insulating layer surrounding the inner, first semi-conductive layer and an outer, second semi-conductive layer surrounding the first insulating layer, said second semi-conductive layer including at least two different earth points along the insulated conductor, the second semi-conductive layer includes breaks comprising electrical discontinuity in the second semi-conductive layer formed by removal of a portion of the second semi-conductive layer around the periphery of the insulated conductor exposing the first insulating layer forming grooves flanked by the second semi-conductive layer each break being located between two consecutive earth points, and a shielding device located at each break for reducing amplification of the electric field strength produced at each break when the conductor is energized, comprising a second insulating layer of a selected length having ends, said second insulating layer arranged over each groove, covering the external portion of the first insulating layer, said second insulating layer covering a part of the second semi-conductive layer flanking each groove, and a third semi-conductive layer of a selected length having a contact end and a free end, the contact end covering one end of the second insulating layer and being in electric contact with the second semi-conductive layer and the free end not covering the other end of the second insulating layer, the free end extending over a part of the second semi-conductive layer a distance sufficient to cover the groove and being out of contact with said second semi-conducting layer.

* * * * *